US008693641B2

(12) United States Patent
Farley

(10) Patent No.: US 8,693,641 B2
(45) Date of Patent: Apr. 8, 2014

(54) FIRE ALARM WITH INTEGRATED FIREFIGHTER COMMUNICATIONS SYSTEM

(75) Inventor: Daniel G. Farley, Westminster, MA (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 0 days.

(21) Appl. No.: 13/601,585

(22) Filed: Aug. 31, 2012

(65) Prior Publication Data

US 2014/0064461 A1    Mar. 6, 2014

(51) Int. Cl.
*H04M 11/04* (2006.01)
(52) U.S. Cl.
USPC ............... 379/43; 379/45; 379/47; 340/506; 340/531; 340/577; 340/692; 455/11.1; 455/7
(58) Field of Classification Search
USPC ........ 379/43, 45, 47; 340/506, 531, 577, 692; 455/11.1, 7
See application file for complete search history.

(56) References Cited

U.S. PATENT DOCUMENTS

2005/0231349 A1\* 10/2005 Bhat ............................. 340/506
2010/0227547 A1\* 9/2010 DiPiazza .......................... 455/7

\* cited by examiner

*Primary Examiner* — Joseph J Nguyen
(74) *Attorney, Agent, or Firm* — Kacvinsky Daisak PLLC

(57) ABSTRACT

A fire control system may include a fire alarm control panel situated at a first location, the fire alarm control panel coupled to a first hardwire circuit. The fire control system may also include one or more telephone stations, wherein each telephone station of the one or more telephone stations is disposed at a different location than each other telephone stations and coupled through the first hardwire circuit to the fire alarm control panel, and one or more radio repeaters are each disposed at one or more respective locations, and wherein each radio repeater is operative to receive audio information as a radio signal and to transmit the audio information as an electrical signal through a second hardwire circuit to the central telephone.

22 Claims, 7 Drawing Sheets

FIRE ALARM WITH INTEGRATED FIREFIGHTER COMMUNICATIONS SYSTEM

BACKGROUND OF THE INVENTION

1. Field of the Invention

Embodiments of the invention relate to the field of fire alarm systems.

2. Discussion of Related Art

In current technology, firefighter telephone systems that are deployed in structures such as multi-story buildings employ multiple fixed communication installations that typically include a pre-mounted telephone handset, or a receptacle into which a portable handset can be connected in order to communicate with other points in the telephone system. By providing multiple fixed communication installations for telephone equipment, a firefighter is afforded the ability to communicate with other firefighters or with a command station. However, the fixed communication installations tether a firefighter to the particular location which may hamper work during an emergency. For example, the firefighter may have limited access to the location of a fixed communication installation due to an emergency condition within a building, or may be required to travel to a location of the fixed communication installation that hampers the ability to respond to the emergency and to assess the situation in another part of the building where an emergency condition exists.

In order to provide firefighters with greater flexibility, some town and/or city agencies provide radio equipment including radio repeaters with fire department vehicles to facilitate communications. High power radios (~40 W) may also be provided for use by firefighters when entering a building in response to a call. This facilitates the ability of the firefighter to communicate with a command station from within the interior of the building. However, such high power radios are bulky, heavy and emit radio signals that may still be of insufficient strength to penetrate interior parts of a building, such that communications may still be degraded or cut-off within certain structures.

In other approaches, buildings may install emergency equipment for radio communications that use radiating cable ("leaky coax") in order to facilitate firefighter communications. However, the radio strength leaked from floor to floor in a building employing leaky coax may generally be less than that employed in active radio systems. Moreover, because wiring in such systems is unsupervised, an accidental cut in a coaxial cable would unlikely be identified until radio communications are attempted and result in failure. This event may occur during an actual emergency in which case the radio communications failure may have severe consequences.

SUMMARY

Embodiments of the present disclosure are directed to systems and methods for emergency communications within a building.

In one embodiment a fire control system includes a fire alarm control panel situated at a first location in a building. The fire control system further includes one or more telephone stations, each telephone station of the one or more telephone stations disposed at a different location in the building than each other telephone station and coupled through a hardwire circuit to the fire alarm control panel. The fire control system further includes one or more radio repeaters each disposed at one or more respective locations in the building, and each radio repeater operative to receive first audio information as a first radio signal and to transmit the first audio information as a first electrical signal through the hardwire circuit to the central telephone.

In another embodiment, a method to provide fire protection to a building, comprises placing a fire alarm control panel situated at a first location in the building, coupling the fire alarm control panel through a hardwire circuit to a plurality of telephone stations, each telephone station disposed at a different location in the building, and coupling the fire alarm control panel to at least one RF repeater operative to amplify a radio signal received at a first location from a wireless handset located within the building and to transmit the received radio signal within a predetermined broadcast distance, wherein a radio signal strength is sufficient for wireless audio communications between the first handset and a second handset located within the building.

DESCRIPTION OF EMBODIMENTS

Figure 1A:
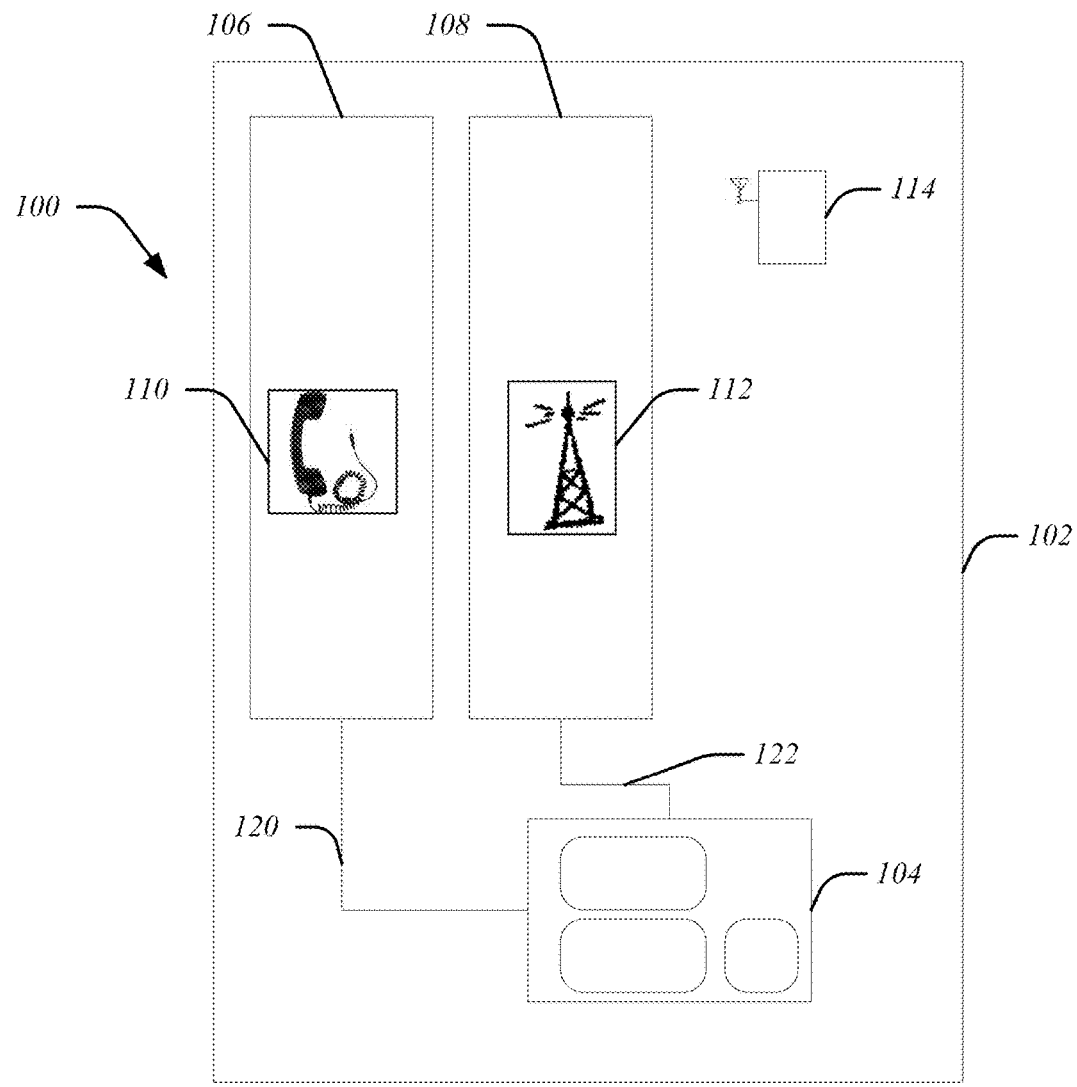
FIG. 1a is a schematic depiction of an exemplary fire control system.

The present invention will now be described more fully hereinafter with reference to the accompanying drawings, in which preferred embodiments of the invention are shown. This invention, however, may be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout.

To solve the deficiencies associated with the methods noted above, novel and inventive techniques for managing communications, and in particular, communications in a fire control system are disclosed. In various embodiments, a fire control system includes a fire alarm control panel that is coupled to one or more telephone stations through a first hardware connection (or circuit). The fire alarm control panel may control a wired circuit that is connected to multiple telephone stations within a building in which the fire alarm control panel is situated. In some implementations, one or more telephone stations may be located on each story of a multistory building. Each telephone station may allow a user at the telephone station to communicate with another user located at another telephone station. In some embodiments, a telephone station may include a telephone receptacle into which a telephone handset may be plugged, while in other embodiments the telephone station may include a preinstalled telephone handset. In addition, the fire control system may include a set of radio repeaters that are situated in different locations within the building to provide radio coverage throughout the building. In various embodiments, the set of radio repeaters may be supervised by the fire alarm control panel via a second hardwire circuit. According to different embodiments, the first and second hardwire circuits may be different hardwire circuits or may be the same hardwire circuit.

FIG. 1a illustrates one embodiment of a fire control system 100. As illustrated, the fire control system 100 is situated in a structure 102, which may be a multistory building. The fire control system 100 includes various components that may be deployed at different locations within the structure 102. As illustrated, the fire control system 100 includes a fire alarm control panel (FACP) 104, which may be located in a lower story of a multistory building in some embodiments. As further illustrated in FIG. 1a, the fire control system 100 includes a wired telephone system 106 that is linked to the FACP 104 through a hardwire connection. The wired telephone system 106 may include a hardwire circuit that contains one or more outlets or stations 110 for telephone handsets that are distributed at different locations within the structure 102. The terms "hardwire" and "wired" are used herein interchangeably, refer in reference to circuits to a type of circuit or connection between multiple components that connects one or more components via a physical wire(s), fiber(s), or other physical structures that conducts electrical or electromagnetic signals or both, between the different components. Although not specifically illustrated, a master telephone may be located proximate the FACP 104. In operation the stations 110 for telephone handsets may be preinstalled or may be installed when used in receptacles (not separately shown) provided in the wired telephone system 106.

In one example, the FACP 104 may perform known various other known functions, including receiving information from environmental sensors (not shown) designed to detect changes associated with fire, monitoring their operational integrity and providing for automatic control of equipment, and transmission of information necessary to prepare the facility for fire based on a predetermined sequence. The FACP 104 may also supply electrical energy to operate any associated sensor, control, transmitter, or relay (also not shown).

As also depicted in FIG. 1a, the fire control system 100 includes a radio repeater system 108 that may include one or more radio repeaters 112, each positioned at a different location in the structure 102. The radio repeaters 112 may be positioned on different stories of a multistory building in some embodiments. In other embodiments, multiple radio repeaters may be placed within a single story of a structure, such as a building spanning a large area on any given story. The radio repeaters 112 may be distributed in such a manner that radio signals, including relatively lower power signals of about a few hundred milliwatts (mW), are received and transmitted throughout all areas within the structure 102. In this way, a firefighter's radio may transmit and receive signals that are amplified by one or more radio repeaters 112, thereby making the firefighter's radio effective for communication throughout the structure 102. As detailed below, the fire control system 100 may forward radio signals received from a wireless radio through various hardwired and wireless components so as to facilitate communication between multiple locations within the building 102. The fire control system 100 thereby provides a supervised wired connection between multiple locations within the structure 102 and supervised interconnection of portable radios that may operate anywhere within the structure 102.

The fire control system 100 also provides the advantage over conventional systems in that it helps facilitate communications between firefighters or other emergency personnel that does not rely on the strength of a portable radio that a firefighter may be equipped with when responding to an emergency. Typically portable radios may transmit with a power between about 0.5 watts (500 mW) and 5 watts. While some departments may provide portable high powered radios that transmit at power levels as high as about 40 watts or more, such radios are bulky and may present a long term health hazard. When a firefighter employs a lower powered portable radio in which the transmit power may be about one watt or less, building walls and objects within buildings may attenuate radio signals to the extent that radio communications are hampered in some regions. By providing radio repeaters 112 at predefined locations in the structure 102, the radio communications within the entire structure 102 may be facilitated without requiring a firefighter to employ a high powered radio, such as a 40 watt radio for communications with other personnel. For example, a voice message transmitted from a lower power firefighter radio 114 (e.g., having a typical power of about 0.5 to 2 W) may be received by one or more radio repeaters 112 that are located in the structure 102 and subsequently forwarded by fire control system 100 to be received at various locations within structure 102, such as at the FACP 104, as discussed below. In one particular example, radio repeaters 112 may be located on every other floor of the stricture 102, and each radio repeater 112 may be operative to detect radio transmissions from a firefighter radio 114 that are transmitted with a power of 0.5 W or greater when the firefighter radio 114 is located on the same or an adjacent floor of the structure 102. Likewise, by providing one or more radio repeaters 112 throughout the structure 102, the fire control system 100 facilitates transmission of voice communications to an operator of a low power firefighter radio 114 at any location within the structure 102.

In accordance with various embodiments, the wired telephone system 106 and radio repeater system 108 may be integrated into a fire control system in different manners. In the embodiment of FIG. 1a, the fire control system 100 includes a wired telephone system 106 that is coupled to the FACP 104 through a first hardwire circuit 120, and the radio repeater system 108 is coupled to the FACP through a second hardwired circuit 122.

Figure 1B:
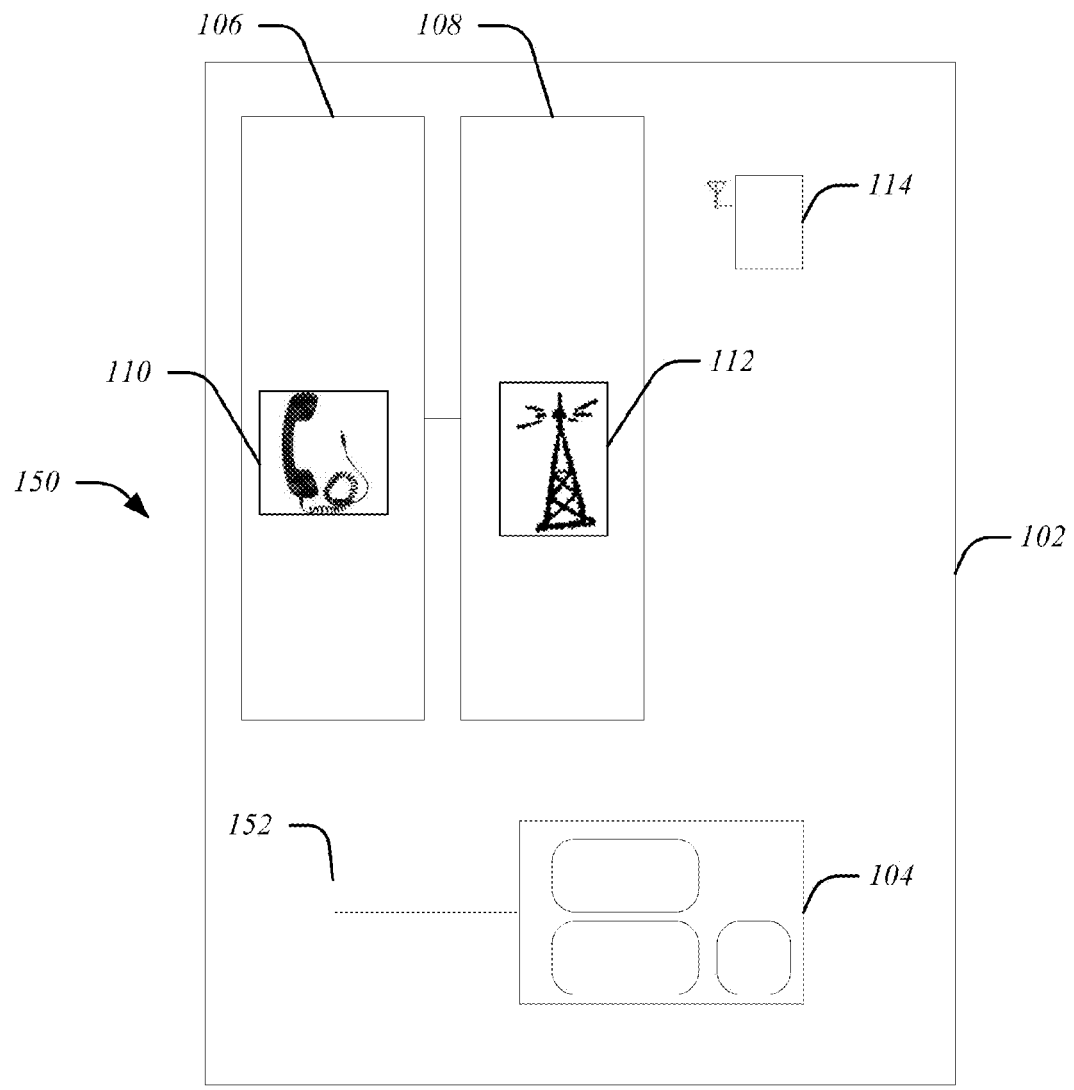
FIG. 1b is a schematic depiction of another exemplary fire control system.

FIG. 1b depicts an alternative embodiment of a fire control system 150 in which the wired telephone system 106 and radio repeater system 108 are coupled to the FACP 104 through a common hardwired circuit 152. In either of the embodiments of FIGS. 1a and 1b, supervised emergency communications within the building 102 are provided in multiple ways, including through a series of fixed telephone locations of the wired telephone system 106 and through mobile communications provided by the radio repeater system 108. Advantages of this type of system are further detailed with respect to the figures to follow.

Figure 2:
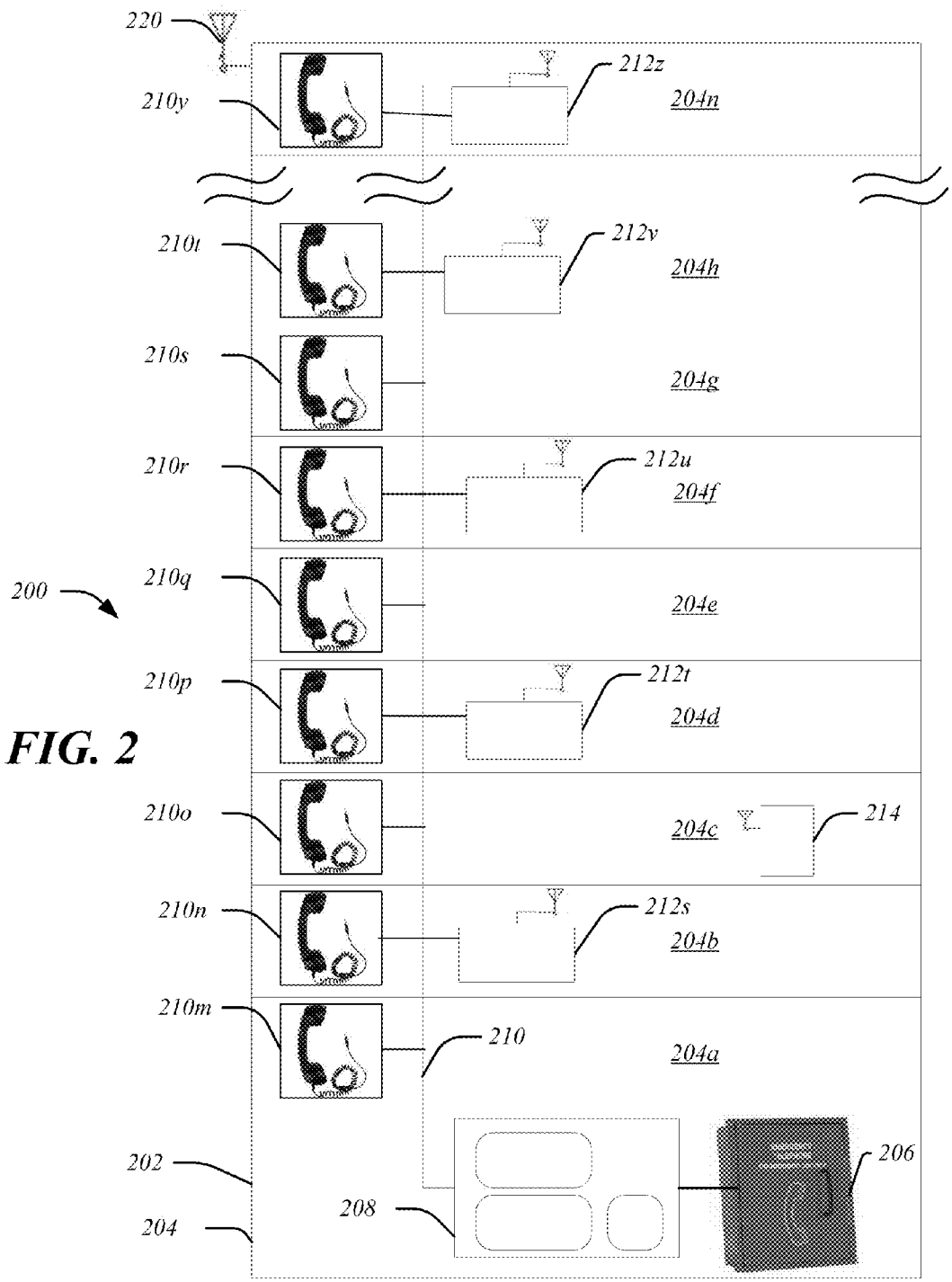
FIG. 2 is a schematic depiction of a further exemplary fire control system.

FIG. 2 depicts a fire control system 200 according to another embodiment. In this embodiment, the fire control system 200 is deployed in a building 202, which is a multistory building. In the example depicted in FIG. 2, the building 202 includes, in addition to a floor (story) 204, stories 204a to 204n, where "a" to "n" may represent any positive integer. Although depicted as having at least ten stories, in various embodiments the fire control system 200 may include fewer stories or many more stories than then. The embodiments are not so limited in this context. As further shown in FIG. 2, a master telephone 206 and fire alarm control panel 208 are deployed in the story 204, which may be a lower story such as a ground story or basement of the building 202. The FACP 208 is coupled to a wired telephone system 210 that includes multiple telephone stations 210m to 210y, where m to y represent any positive integer. Notably, in various embodiments, one telephone station may be included in each story of the building 202. In other embodiments, more than one telephone station (receptacle) may be included in one or more of the stories 204a to 204n, while in still other embodiments, not all stories 204a to 204n need include a telephone station. An operator stationed at the master telephone 206 may thereby communicate with a person located at any of the telephone stations 210m to 210y, provided that a telephone handset is plugged into the given telephone receptacle in the telephone station. The FACP 208 may be operative to receive information from environmental sensors designed to detect changes associated with fire, to monitor their operational integrity and provide for automatic control of equipment, and transmission of information necessary to prepare the facility for fire according to a predetermined sequence. The FACP 208 may also supply electrical energy to operate any associated sensor, control, transmitter, or relay, and so forth.

As further illustrated in FIG. 2, the fire control system 200 includes radio repeaters 212s to 212z that are coupled to the FACP 208, where s to z represent any positive integer. In various embodiments, the radio repeaters 212s to 212z are arranged within the building 202 so as to facilitate communications between a mobile firefighter and other personnel, such as a person stationed at the FACP or another firefighter. Because radio signals may be significantly attenuated by objects located within a building including floors, walls, equipment, furnishings, and the like, the radio repeaters 212s to 212z may be distributed in many locations throughout the building 202 so that even communications with low power radios, such as mobile radio 214, are possible throughout the building. In the example suggested by FIG. 2, a radio repeater may be located on every other story, which may be sufficient to ensure communications with low power radios throughout the building, as discussed in detail below. Although not explicitly depicted in FIG. 2, the radio repeaters 212s to 212z may link to the FACP 208 through a different circuit than the wired telephone circuit 210. Also illustrated in FIG. 2 is a building antenna 220 that links radio communications internal to the building 202 with communications external to the building 202.

Consistent with the present embodiments, when the fire control system 200 is in operation, a firefighter equipped with a mobile radio, such as radio 214, may transmit from any location within building 202 a radio message that is received by one of the radio repeaters 212s to 212z. The radio message may be forwarded over a wired circuit (not separately depicted), which may, but need not, form part of the wired telephone circuit 210. As detailed below, this message may then be transmitted to various parties, including a firefighter located at the master telephone 206, or another firefighter equipped with a second mobile radio. In the latter case, the message may be transmitted to the second mobile radio wirelessly by one of the radio repeaters 212s to 212z. The radio repeaters may transmit and receive on separate radio channels so that emergency voice transmission to and from a mobile firefighter having a mobile radio are facilitated. For example, all radio repeaters may transmit on a common predetermined frequency and receive on a different, but common, predetermined frequency.

Figure 3:
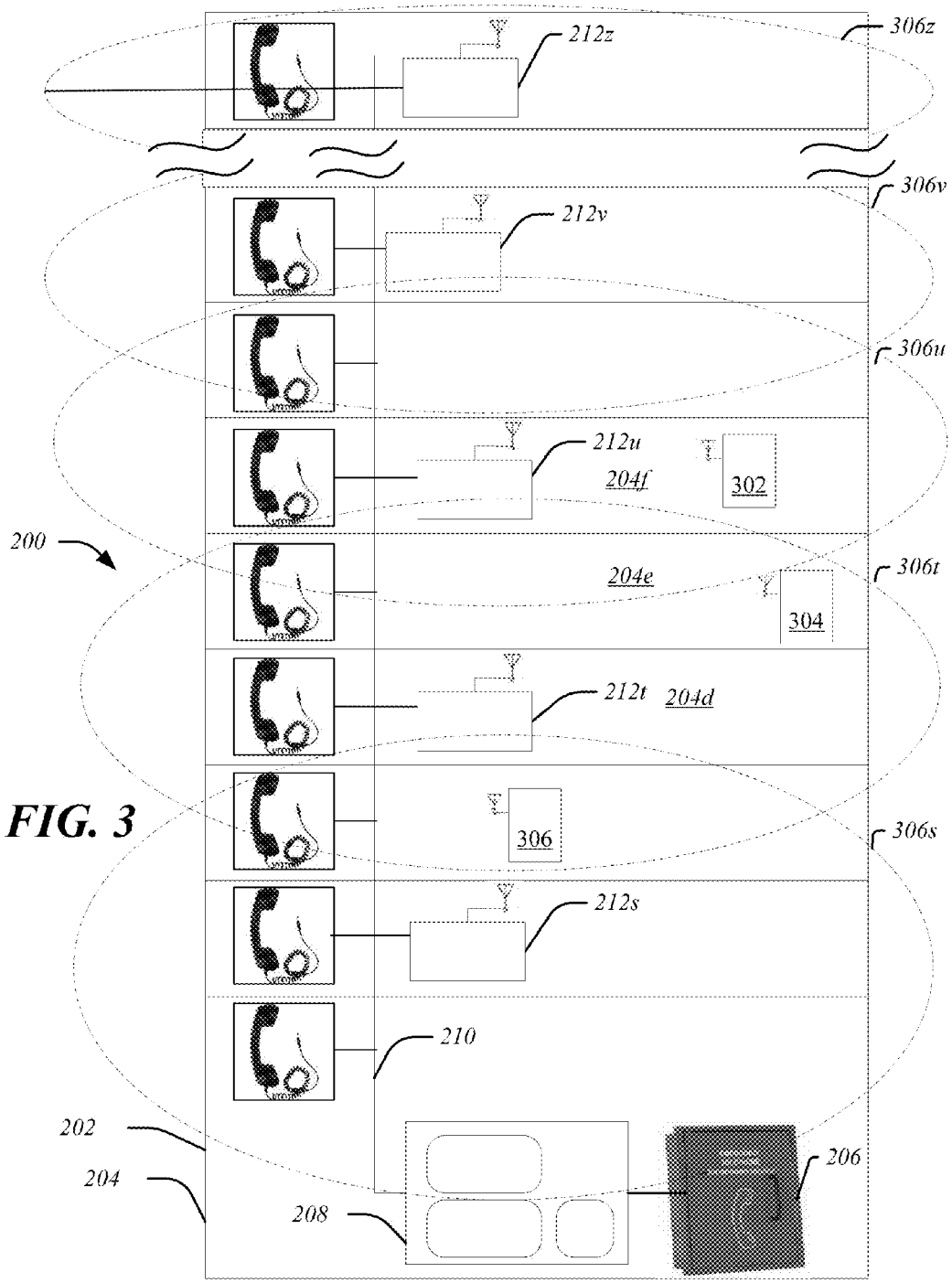
FIG. 3 depicts one example of operation of the system of FIG. 2.

FIG. 3 illustrates one scenario for operation of system 200. When the radio repeaters 212s to 212z are powered on, radio communications between a given radio repeater and a radio such as a portable low power radio, may be effective within a communications range that is in part defined by the power of the portable low power radio, the frequency of radio communications, and by the structure and materials within the building housing the radio repeaters. As noted, for typical modern buildings, radio signals may be attenuated by structures within the building thereby limiting the range for communication, especially for low power radios having operating power less than about several watts. FIG. 3 depicts several communications zones 306s to 306z that may be established for a given set of respective radio repeaters 212s to 212z and a given portable radio power. It is to be noted that the shape of the communications zones may be idealized for the purposes of illustration. Moreover, the size of a communication zone may depend upon the strength of a portable radio to communicate with the radio repeater as well as the strength of the radio repeater itself. In some scenarios, as generally shown in FIG. 3, radio transmission may be effective within a story of a building. This may be the case for many buildings in which there are few heavily reinforced interior walls having material that attenuates the radio transmission. However, radio transmission may be less effective between stories because of attenuation of radio signals by the flooring/ceiling. Accordingly, as shown in FIG. 3, a communications zone established by a radio repeater may only penetrate to an adjacent story of the building or perhaps a next nearest story. In this manner, by deployment of radio repeaters 212s to 212z on every other story communications zones 212s to 212z may extend to the point that a set of overlapping communications zones is created that effectively covers the entire interior region of the building 202.

In the scenario of FIG. 3 a first firefighter (not shown) is deployed on story 204f and employs a radio handset 302, while a second firefighter is deployed on story 204e and employs the radio handset 304. The scenario of FIG. 3 may represent the situation in which a fires emergency takes place on the adjacent stories 204e and 204f, such as a fire that may be present in the adjacent stories. Because the radio handset 302 is within communications zone 306u when the first firefighter initiates a radio message from handset 302 the transmission is received by the radio repeater 212u, which is located on the same story as the radio handset 302. The message may then be forwarded over the fire control system 200 so that communications may take place, for example, with a firefighter stationed at master telephone 206. The radio handset 304, located on story 204e, lies within the communication zone 306t. When the second firefighter initiates a radio message from handset 304, although there is no radio repeater on the story 204e where the second firefighter is located, because the radio handset 304 does lie within communication zone 306t, the transmission is received by the radio repeater 212t, which is located on the adjacent story 204d. The message may then be forwarded over the fire control system 200 so that communications take place, for example, with a firefighter stationed at master telephone 206. In this manner, communications with firefighters using mobile radios are facilitated whether or not a firefighter is on a story having a radio repeater. Moreover, communications are effective even when the firefighter's portable radio operates at a conveniently low power range, such as about 0.5 W.

In various embodiments, when a radio handset is located within two different communications ranges, the handling of radio transmissions may be performed in different ways. FIG. 3 illustrates the example where a radio handset 306 is located within the communications zones 306s and 306t. In one implementation, both radio repeaters 212s and 212t may be configured to transmit the same signal on a repeated frequency.

In another implementation, the radio repeaters may be configured to employ a voter station technique. For example, the radio repeaters 212s and 212t may communicate with each other over a wired circuit, such as wired telephone circuit 210 to determine which radio repeater has the stronger radio signal in communication with the radio handset 306.

Based upon the determination, the radio repeater having the stronger signal is selected as the radio repeater for handling communications with radio handset 306.

Figure 4:
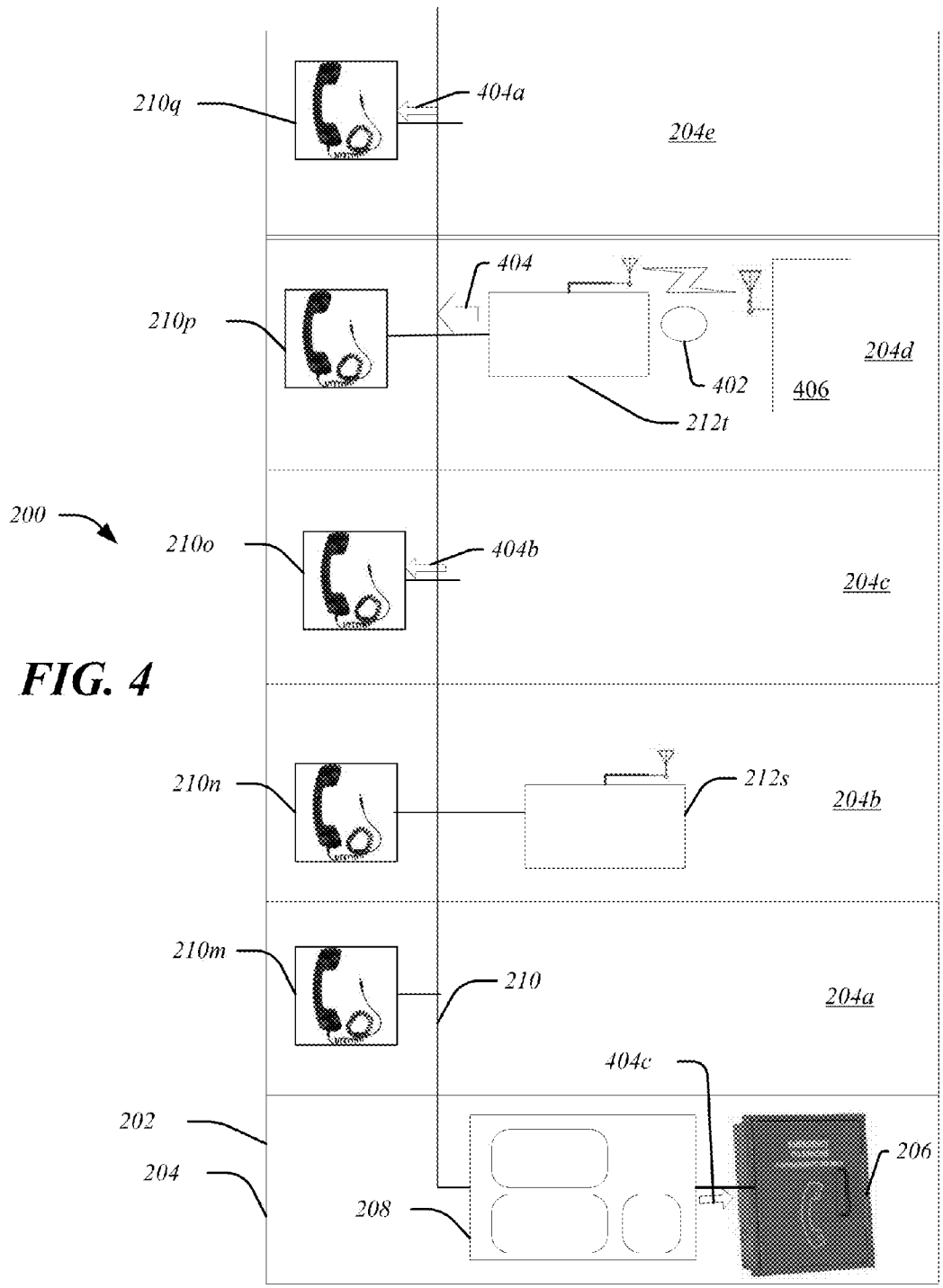
FIG. 4 depicts one scenario for operating the system of FIG. 2 consistent with the present embodiments.

FIG. 4 depicts a further embodiment of the fire control system 200 in which the radio repeaters 212s and 212t are coupled to the FACP 28 through the wired telephone circuit 210. In FIG. 4, only a partial view of building 202 and fire control system 200 is shown, including the stories 204a to 204e. In the scenario shown in FIG. 4, a firefighter (not shown) is located on story 204d. When the firefighter engages the radio handset 406 to transmit a wireless message 402, the wireless message 402 is received by a radio repeater proximate the radio handset 406, such as the radio repeater 212t that is located on the story 204d. The radio repeater 212d may transmit the wireless message as the message 404 over the wired telephone circuit 210. As further shown in FIG. 4, the message 404 may be received at various points connected to the wired telephone circuit 210. For example, a firefighter having a handset plugged into telephone station 210q on story 204e may receive the message as message 404a. Likewise, a firefighter having a handset plugged into telephone station 210o on story 204c may receive the message as message 404b, and a firefighter located at master telephone 206 may receive the message as message 404c. In this manner, a radio message from a firefighter may be transmitted to multiple parties at the same time in addition to a firefighter located at the master telephone 206, including parties that may not have operational radio equipment.

Figure 5:
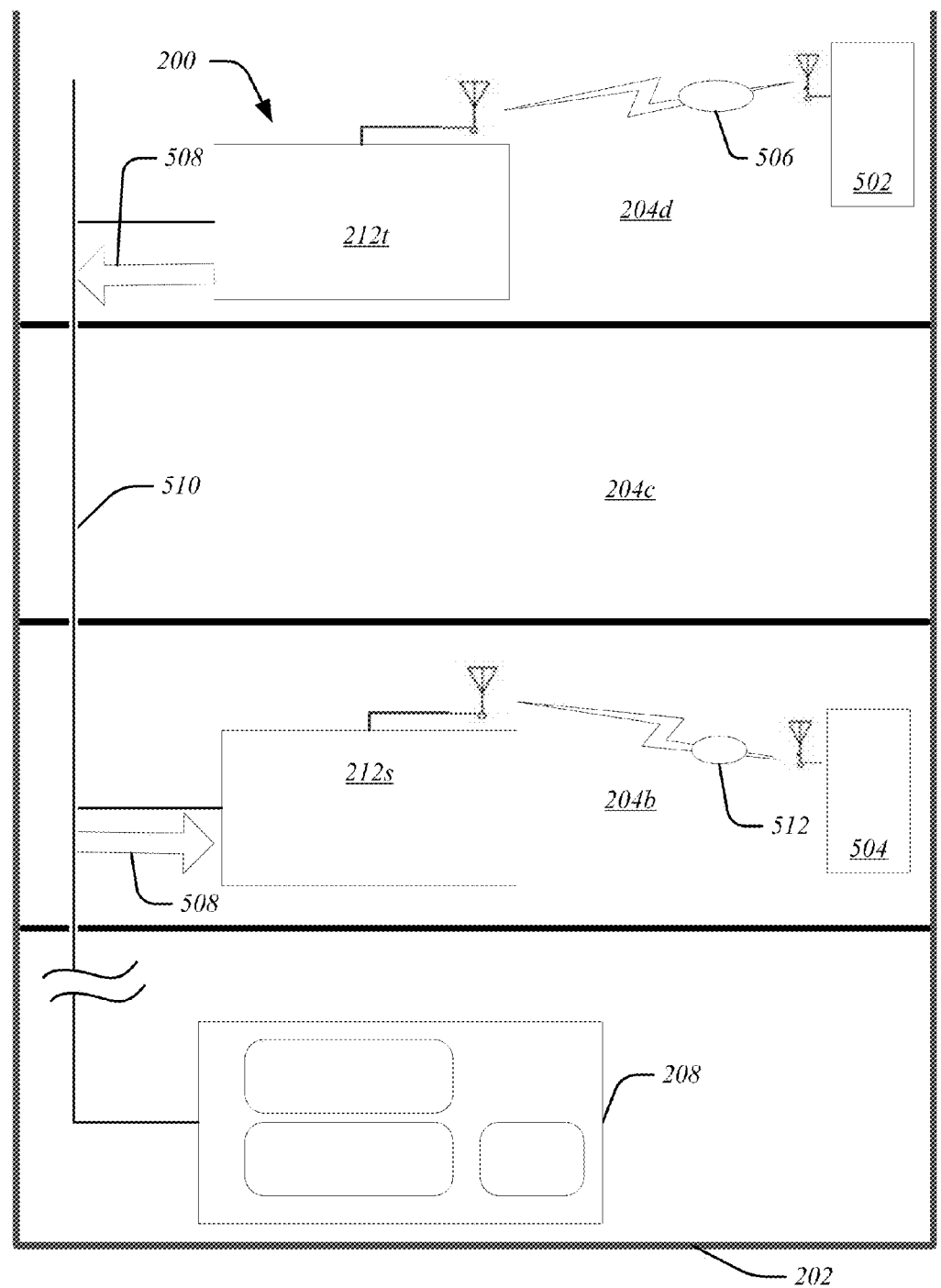
FIG. 5 depicts details of operation of an exemplary fire control system.

FIG. 5 depicts a further embodiment of the fire control system 200 in which the radio repeaters 212s and 212t are coupled to the FACP 208 through a wired circuit 510. In FIG. 5, only a partial view of building 202 and a partial view of the fire control system 200 is shown, including the stories 204b to 204d. A separate circuit (not shown), such as the hardwire telephone circuit 210, may be provided to link telephone stations (also not shown) to the FACP 208, as discussed previously. In addition to linking a set of radio repeaters to the FACP 208, the wired circuit 510 provides a hardwire link between different radio repeaters within the building 202. In particular, the wired circuit 510 facilitates communication between firefighters that may be located in different parts of the building 202, which is especially useful when direct radio communications between the firefighters is difficult or not possible. For example, two mobile firefighters may be deployed on separate stories in the building during an emergency and may need to communicate with one another. The scenario depicted in FIG. 5 shows an example in which a first firefighter (not separately shown) having a portable radio 502 is deployed on story 204d, which also contains a radio repeater 212t that is linked to the wired circuit 510. A second firefighter is deployed on story 204b in which a radio repeater 212s is located. When the portable radio 502 transmits a wireless voice message 506, the radio repeater 212t may receive the wireless voice message 506 and transmit voice signals as a message 508 over the wired circuit 510. This message 508 may be received by various apparatus connected to the wired circuit 510 including the radio repeater 212s. The radio repeater 212s may then transmit a wireless voice message 512 replicating the wireless voice message 506 to the firefighter having the portable radio 504. The firefighter carrying portable radio 504 may likewise transmit a wireless voice message that is picked up by radio repeaters 212s and forwarded along wired circuit 510 and transmitted to portable radio 502 via a wireless message sent from the radio repeater 212t. In this manner, voice may be transmitted between two portable radios deployed at different locations within the building 202 even if the power of the portable radios is insufficient to directly transmit voice over a single wireless link between the two radios. This avoids the need for a firefighter to carry a relatively high powered portable radio, such as a 40 W radio, which may be more effective in establishing direct radio communications with other radios when deployed in the building 202.

The wired circuit 510 may additionally function to transmit control signals as well as voice between different emergency apparatus. Such control signals may constitute signals sent from a first radio repeater that alert the FACP 208 or other devices as to the status of that radio repeater or other equipment.

Figure 6:
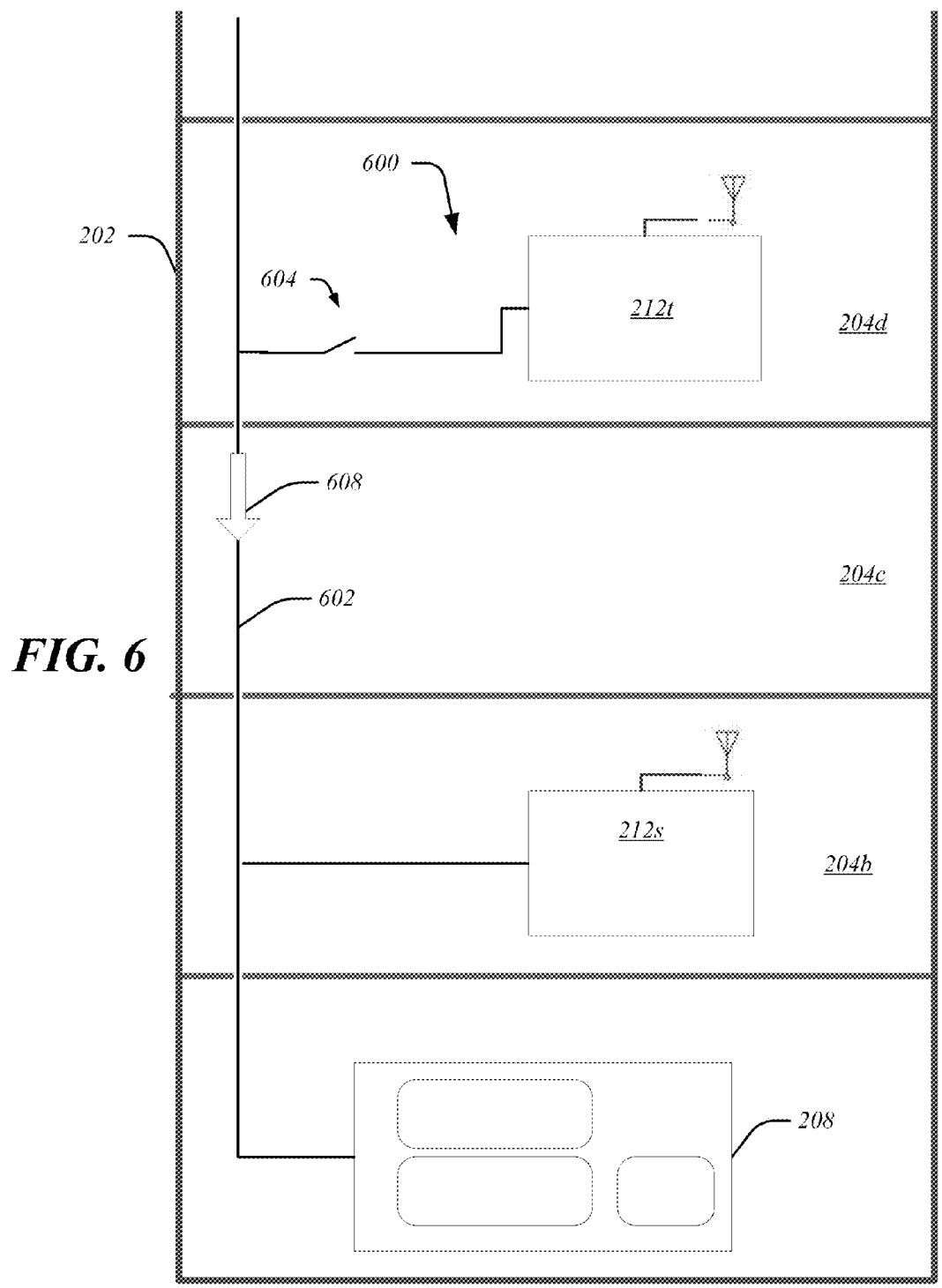
FIG. 6 depicts details of operation of another exemplary fire control system.

In various additional embodiments, a fire control system, such as the fire control system 200, may include a self-test feature that can monitor status of components (equipment) of the fire control system 200 and generate a signal to indicate improperly functioning equipment. For example, a radio repeater of the fire control system 200 may perform a self-test and report results of the self-test to the FACP 208. FIG. 6 illustrates one embodiment in which a fire control system 600 includes a wired circuit 602 that connects a set of radio repeaters to the FACP 208. In the FIG. 6, only a portion of the fire control system is shown, including radio repeaters 212s and 212t located on respective stories 204b, 204d of building 202. In various embodiments, the radio repeaters of fire control system 200 may periodically perform a self-test procedure. In one embodiment, the self-test procedure may be initiated in each radio repeater by a timer in that radio repeater. In other embodiments, the self-test procedure may be initiated by a signal generated by the FACP 208. As discussed previously, consistent with the present embodiments, radio repeaters may be located on every story of building 202, on every other story, or may be distributed within building 202 according to any desired arrangement. By providing periodic self-testing for the various radio repeaters, the fire control system 600 may monitor equipment to verify in a timely and convenient manner that communications are properly functioning throughout building 202.

In one example implementation, the FACP 208 may send signals at the same time to each radio repeater to perform a self-test procedure. In another example implementation, each radio repeater, such as radio repeaters 212s and 212t may be configured to periodically generate a self-test procedure generally at the same time as other radio repeaters, and report the results of the self-test procedure to the FACP 208. However, in other implementations, the self-test procedure may be performed at different times among multiple radio repeaters of the fire control system 600. In order to minimize conflicts between performing a self-test procedure and possible communications to be conducted, the self-test procedure may be limited to a duration of several second or less in some embodiments. Scheduling of the self-test procedure may also be modified so that a self-test is not initiated for a predetermined amount of time after active communications are detected in order to reduce the chances that further communications may conflict with a self-test procedure.

In the scenario specifically depicted at FIG. 6, the radio repeater 212t has performed a self-test procedure and a failure or improper functioning has been detected. In one implementation of a self-test procedure, a radio would have its transmission channel switch to a receive channel, followed by broadcast of a brief tone and verification that the tone is received. Alternatively, a radio may switch the receive channel to perform a self-test. Consistent with the present embodiments, a failure is reported back to the FACP 208 via the wired circuit 602. In one implementation, the radio repeater 212t may generate a signal that is operative to open a circuit or trip a relay to indicate equipment malfunctioning. As shown in FIG. 6, a switch 604 is opened, which may be detected as a signal 608 that propagates along the wired circuit 602 and is conducted to the FACP 208 to indicate equipment malfunction on the story 204d. Similar procedures may be implemented by other radio repeaters in the fire control system 600.

In embodiments in which the wired circuit 602 also serves as a wired telephone circuit as discussed above, control signals to implement a radio repeater self-test procedure may be conducted in various manners. For example, in embodiments in which the fire control system 600 employs the FACP 208 to generate a signal to one or more radio repeaters to initiate a self-test procedure, in one implementation the FACP 208 generates a specific tone that is sent over the wired circuit 602 to trigger self-testing on the receiving radio repeater. In other implementations, the polarity or voltage level of the wired circuit 602 may be changed to trigger self-testing by the radio repeater(s).

In summary, the present embodiments facilitate the use of two-way communications between a firefighter radio and a fire alarm control panel of a fire control system, as well as other components that may be coupled to the fire control system. This is particularly advantageous for scenarios in which a fire control system is deployed in a multistory building or other structure in which low power firefighter radios (<5 W or so) may be ineffective in directly communicating with other radios when the firefighter radios are brought into the interior of the building.

Herein, novel and inventive apparatus and techniques for providing two way communications with a portable radio deployed within a structure having a fire control system are disclosed. The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings.

Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A fire control system, comprising:
a fire alarm control panel situated at a first location, the fire alarm control panel coupled to a first hardwire circuit;
one or more telephone stations, each telephone station of the one or more telephone stations disposed at a different location than each of the other telephone stations and coupled through the hardwire circuit to the fire alarm control panel; and
one or more radio repeaters each disposed at one or more respective locations, each radio repeater operative to receive audio information as a first radio signal and to transmit the audio information as a first electrical signal through a second hardwire circuit to the fire alarm control panel, each radio repeater further operative to receive the audio information as a second electrical signal through the second hardwire circuit and to transmit the audio information as a second radio signal.

2. The fire control system of claim 1, each radio repeater configured to operate at a power of 500 mW or greater.

3. The fire control system of claim 1, comprising a plurality of radio repeaters each located at a different location, wherein the one or more telephone stations comprises a plurality of telephone stations that constitutes a larger number than that of the plurality of radio repeaters.

4. The fire control system of claim 3, the plurality of radio repeaters operative to provide a plurality of broadcast zones wherein adjacent broadcast zones of the plurality of broadcast zones overlap one another.

5. The fire control system of claim 3, wherein the fire control system is disposed within a multistory structure, wherein a radio repeater is located on every other story of the multistory structure, and wherein at least one radio repeater is operative to detect a radio signal having a strength of 500 mW or greater.

6. The fire control system of claim 1, the one or more radio repeaters operative to perform a self-test procedure to determine equipment malfunction.

7. The fire control system of claim 6, each repeater comprising a self-test module operative to send a failure indication to the fire alarm control panel when results of the self-test procedure indicate a system component of the fire control system proximate the each repeater is improperly functioning.

8. The fire control system of claim 1, the one or more radio repeaters operative to trip a relay in the second hardwire circuit to indicate a system component malfunction.

9. The fire control system of claim 1, the one or more radio repeaters comprising a timer to periodically generate the self-test.

10. The fire control system of claim 1, the fire alarm control panel operative to initiate the self-test procedure to be performed by the one or more radio repeaters by one of: generating a tone conducted over the second hardwire circuit, changing the polarity of the second hardwire circuit, and changing the voltage level of the second hardwire circuit.

11. The fire control system of claim 1, wherein the first hardwire circuit and the second hardwire circuit are the same hardwire circuit.

12. The fire control system of claim 1, wherein the first hardwire circuit includes a master telephone disposed proximate the fire alarm control panel.

13. A method to provide fire protection to a structure, comprising:
coupling a fire alarm control panel through a first hardwire circuit to one or more telephone stations, each telephone station disposed at a different location;
coupling the fire alarm control panel through a second hardwire circuit to a plurality of radio repeaters;
receiving audio information at one or more of the radio repeaters as a first radio signal;
transmitting the audio information to the fire alarm control panel and to one or more of the plurality of radio repeaters through the second hardwire circuit, the audio information transmitted to the fire alarm control panel as a first electrical signal, the audio information transmitted to the one or more of the radio repeaters as a second electrical signal; and
transmitting, from the one or more radio repeaters, the audio information as a second radio signal.

14. The method of claim 13, comprising providing a plurality of radio repeaters each located on a different story of a building that houses the fire alarm control panel and the first and second hardwire circuits.

15. The method of claim 14, comprising, providing using a plurality of radio repeaters a plurality of respective broadcast zones wherein adjacent broadcast zones of the plurality of broadcast zones overlap one another.

16. The method of claim 13, further comprising performing a self-test procedure at each radio repeater of the one or more radio repeaters to determine equipment malfunction.

17. The method of claim 16, further comprising generating a failure indication when equipment of the fire control system proximate the each repeater is improperly functioning.

18. The method of claim 13, further comprising tripping a relay in the second hardwire circuit to indicate system component malfunction.

19. The method of claim 13, comprising periodically generating the self-test procedure using a timer in the one or more radio repeaters.

20. The method of claim 13, further comprising:
   transmitting audio information from the master telephone over the second hardwire circuit to a plurality of radio repeaters; and
   forwarding the audio information as a plurality of wireless messages over the respective plurality of radio repeaters.

21. The method of claim 13, wherein the first hardwire circuit and the second hardwire circuit are the same hardwire circuit.

22. The method of claim 13, wherein the first hardwire circuit includes a master telephone proximate the fire alarm control panel.

* * * * *